Patented Feb. 4, 1941

2,230,772

UNITED STATES PATENT OFFICE 2,230,772

PROCESS OF PREPARING SUBSTANCES HAVING THE EFFICACY OF THE CORTICAL HORMONE OR INTERMEDIATE PRODUCTS FOR THE PREPARATION OF SUCH SUBSTANCES

Max Bockmühl, Gustav Ehrhart, Heinrich Ruschig, and Walter Aumüller, Frankfort-on-the-Main-Hochst, Germany, assignors to Winthrop Chemical Company, Inc., New York, N. Y., a corporation of New York No Drawing. Application June 29, 1938, Serial No. 216,470. In Germany July 5, 1937

6 Claims. (Cl. 260—397)

The present invention relates to a process of preparing substances having the efficacy of the cortical hormone or intermediate products for the preparation of such substances.

We have found that substances having the efficacy of the cortical hormone are obtained by treating in known manner a compound of the formula R—CO.CH₃ wherein R stands for a cyclopentanopolyhydrophenanthrene nucleus with an agent causing the transformation of the methyl group into the group CH₂OH or into the corresponding ester.

There are various methods by which the process may be performed. As an agent causing the transformation of the group —CH₃ into the group —CH₂.OH there may preferably be used lead tetracetate. It is advisable to carry out the reaction at a raised temperature. As starting materials there may be used the compounds of the following formula

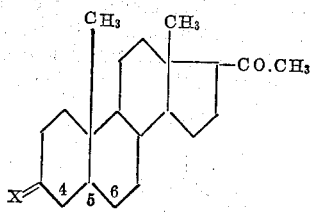

wherein X stands for oxygen or for one of the groupings

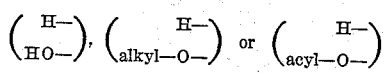

and wherein one double bond exists within the range of the carbon atoms 4, 5 and 6.

It may also be useful to start from compounds of the following formula

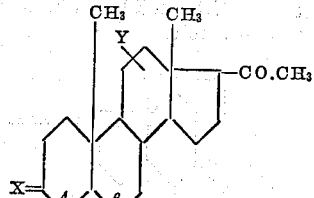

wherein X stands for oxygen or for one of the groupings

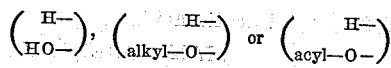

Y stands for an esterified or a non-esterified hydroxyl group and wherein one double bond exists within the range of the carbon atoms 4, 5 and 6.

The process is of particular interest if there are used as starting materials either the progesterone of the formula

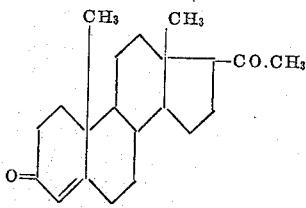

or the acetoxyprogesterone of the formula

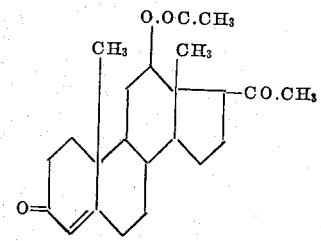

or the pregnenolone of the formula

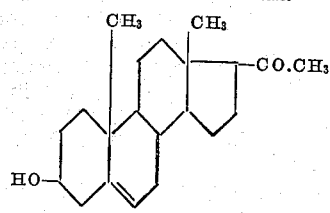

The reaction may be performed in the presence of various solvents among which glacial acetic acid and benzene have been found to be particularly useful.

It is also possible to halogenate in 21-position and oxidize a substance of the general formula

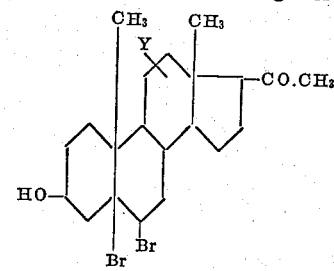

wherein Y stands for hydrogen or an esterified or a non-esterified hydroxyl group, and in order to eliminate the halogen situated in the nucleus, to treat the compound with sodium iodide and then to exchange the halogen atom standing in 21- position for the OH-group or an acyl-group, for instance by treatment with silver acetate in a solution of glacial acetic acid.

All the compounds obtainable by the processes herein described are distinguished by the fact that they show the effects of the cortical hormone or are intermediate products for the preparation of such substances.

The following examples serve to illustrate the invention, but they are not intended to limit it thereto:

(1) 0.47 gram of progesterone and 1 gram of lead tetracetate are together heated in 15 cc. of glacial acetic acid for 7 hours at 75° C.–85° C. The solution, which in the beginning is of a light-brown color, assumes a yellow color; it is then poured into water, the aqueous colloidal mixture is extracted with ether and the ethereal solution is thoroughly washed with water. The residue of the dry ethereal solution amounts to 470 mgms.

(2) 0.5 gram of acetoxyprogesterone as it is described in our co-pending U. S. patent application Serial No. 190,324 filed February 12, 1938, in 20 cc. of glacial acetic acid is heated with 1 gram of lead tetracetate for 7 hours to 80° C., and the solution produced is further treated in the manner prescribed in the preceding example.

(3) 50 grams of progesterone are dissolved in 1.5 liters of glacial acetic acid, 108 grams of lead tetracetate are added to the solution and the mixture is kept for 7 hours at 75° C. to 85° C., while stirring. After the oxidation is complete the solution is poured into water and the colloidal mixture is extracted with ether, the ethereal solution is washed with sodium carbonate solution and water and then dried over sodium sulfate. The ethereal solution is then separated from the sodium sulfate by filtration and then evaporated. There remains a residue of 53.9 grams.

3.55 grams of this residue are distilled under highly reduced pressure. Boiling point 200° C. to 220° C. under a pressure of 0.02 mm. The yield of the distillate amounts to 3.05 grams. By crystallizing the distillate from ether there is obtained the deshydroxycorticosterone-acetate melting at 160° C.–165° C. The deshydroxycorticosterone-acetate may be saponified in aqueous alcohol with hydrochloric acid. The deshydroxycorticosterone melts at 142° C.–146° C.

We claim:

1. The process which comprises treating a compound of the formula

wherein R stands for a cyclopentanopolyhydrophenanthrene nucleus, the CO.CH₃ group being attached to the 17-carbon atom with lead tetracetate.

2. The process which comprises causing lead tetracetate at an elevated temperature to act upon a compound of the following formula

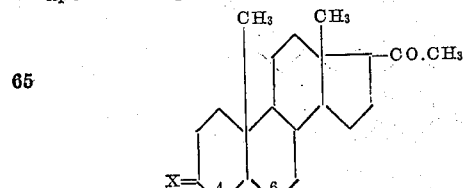

wherein X stands for a member of the group consisting of

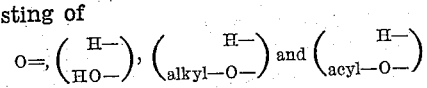

and wherein one double bond exists within the range of the carbon atoms 4, 5 and 6.

3. The process which comprises causing lead tetracetate at an elevated temperature to act upon a compound of the following formula

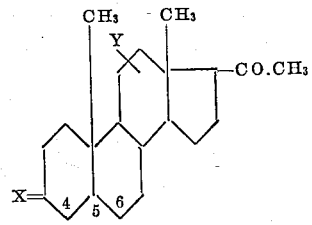

wherein X stands for a member of the group consisting of

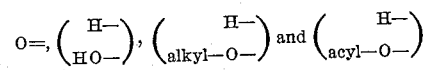

Y stands for a member of the group consisting of hydroxy and esterified hydroxyl groups and wherein one double bond exists within the range of the carbon atoms 4, 5 and 6.

4. The process which comprises causing lead tetracetate at a temperature between about 75° C. and about 85° C. to act upon the compound of the following formula

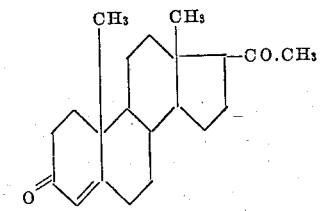

dissolved in glacial acetic acid.

5. The process which comprises causing lead tetracetate at a temperature between about 75° C. and about 85° C. to act upon the compound of the following formula

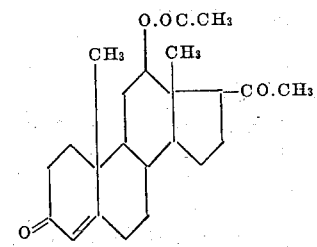

dissolved in glacial acetic acid.

6. The process which comprises causing lead tetracetate at a temperature between about 75° C. and about 85° C. to act upon the compound of the following formula

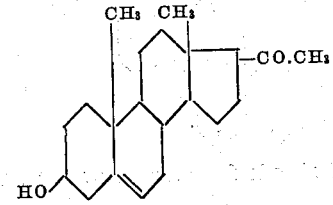

dissolved in glacial acetic acid.

MAX BOCKMÜHL.
GUSTAV EHRHART.
HEINRICH RUSCHIG.
WALTER AUMÜLLER.